United States Patent [19]

Berchem

[11] Patent Number: 4,550,757

[45] Date of Patent: Nov. 5, 1985

[54] TRACTION CHAIN FOR A DRIVEN WHEEL OF A WHEELED VEHICLE

[75] Inventor: Rütger Berchem, Essen-Schuir, Fed. Rep. of Germany

[73] Assignee: Berchem & Schaberg GmbH, Gelsenkirchen, Fed. Rep. of Germany

[21] Appl. No.: 543,951

[22] Filed: Oct. 20, 1983

[30] Foreign Application Priority Data

Oct. 22, 1982 [DE] Fed. Rep. of Germany ....... 3239099

[51] Int. Cl.$^4$ .......................................... B60C 27/20
[52] U.S. Cl. .................................... 152/228; 152/243
[58] Field of Search .......... 192/228, 227, 226, 225 R, 192/208, 223, 232–238, 239–245, 220

[56] References Cited

U.S. PATENT DOCUMENTS

| | | | |
|---|---|---|---|
| 1,270,550 | 6/1918 | Poling | 152/228 |
| 2,052,893 | 9/1936 | O'Konesky | 152/228 |
| 2,441,429 | 5/1948 | Masure | 152/228 X |
| 4,243,088 | 1/1981 | Labonville | 152/228 X |

*Primary Examiner*—Edward Kimlin
*Assistant Examiner*—Thomas Bokan
*Attorney, Agent, or Firm*—Karl F. Ross; Herbert Dubno

[57] ABSTRACT

A traction element for a traction chain for a wheel of a vehicle, especially a pneumatic tire wheel, has a flat oval configuration and is formed in one piece from a die forged steel with four eyes at corners of an imaginary rectangle along the sides of which transverse ribs and ribs parallel to the direction of travel are provided. The body is in the form of a ring extending substantially the full width of the tire.

4 Claims, 3 Drawing Figures

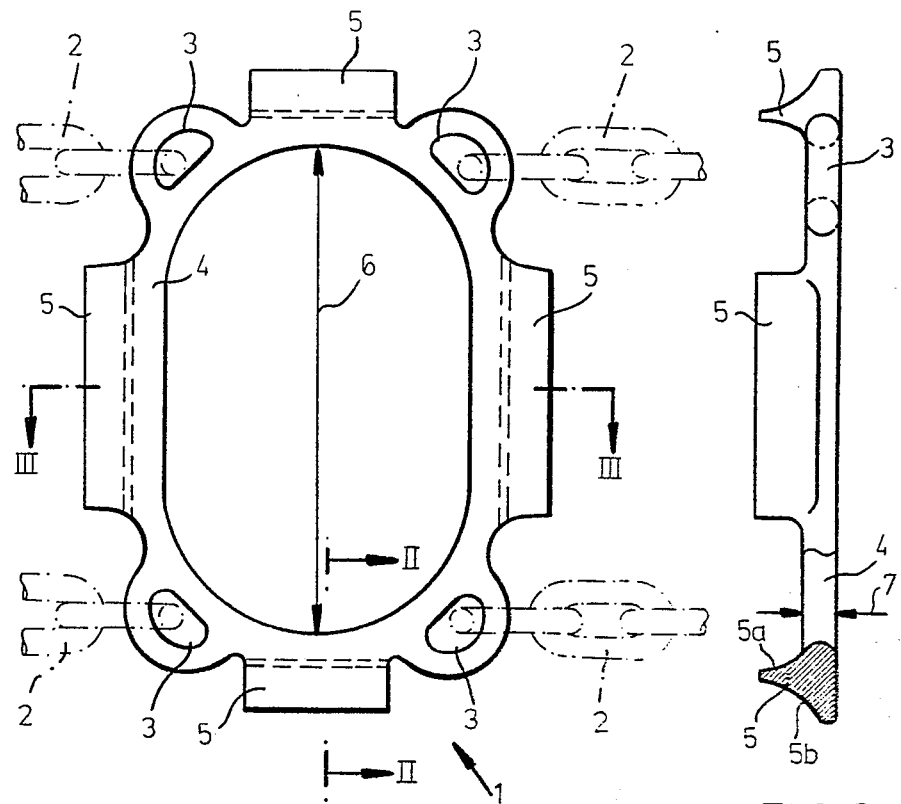
FIG.1
FIG.2
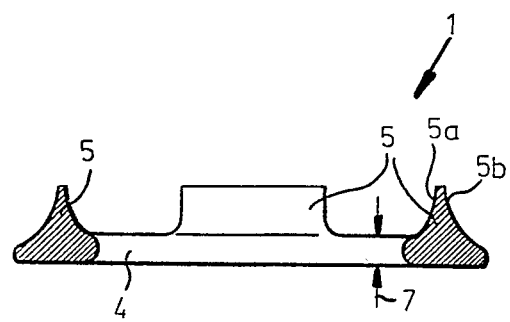
FIG.3

TRACTION CHAIN FOR A DRIVEN WHEEL OF A WHEELED VEHICLE

FIELD OF THE INVENTION

My present invention relates to a traction chain for a driven wheel of a wheeled vehicle and especially for a pneumatic tire wheel. More particularly, the invention relates to a traction device for increasing the traction of a pneumatic tire in snow or ice conditions or wherever augmented traction is desired.

BACKGROUND OF THE INVENTION

It is known to provide for wheeled vehicles and especially for pneumatic-tire wheeled vehicles such as tractors, trucks, passenger automobiles and even two-wheel vehicles, traction-increasing devices which may be referred to as traction chains or tire chains, so as to increase the traction between the wheel and the road or ground surface, especially under conditions in which a high degree of slip may be expected.

Such conditions are snow and ice conditions primarily but may also be other conditions in which skidding is possible.

The devices are known as snow chains, tire chains or the like and may include an actual chain structure provided with one or more traction elements which lie across the breadth of the tread of the tire and bite into the ice or snow.

Traction elements in this type have a wide variety of shapes or forms and may include rubber bars or the like spanning the tread of the tire, metal ribs or bars which are linked together to form the chain or are spaced apart and are connected to the chain which is used to fit the traction elements onto the tire. Traction chains or elements of the aforedescribed type may be also used for tractors or construction machinery so as to increase the bite of the wheels in soft ground.

In general, the traction elements hitherto used are prone to wear, readily lose their ability to bite into the snow, ice or ground, and have other disadvantages with respect to the way in which they are attached to the chain or are held onto the wheel.

OBJECTS OF THE INVENTION

It is the principal object of the present invention to provide an improved traction element for a traction chain of a wheeled vehicle whereby some or all of these disadvantages are obviated.

Another object of this invention is to provide a traction element which not only will assure an effective grip on the road and ground surface by increasing traction, but will also contribute to the stability of the path of the vehicle.

Yet another object of the invention is to provide a traction element for the purposes described which can be fabricated simply and economically and provides the vehicle with improved tracking.

SUMMARY OF THE INVENTION

These objects and others which will become apparent hereinafter are attained in accordance with the present invention, with a traction element which has the configuration of a ring and which has at four diametrically opposite locations of the ring with a spacing transverse to the travel direction and in the travel direction, respective eyes which can be coupled to chain links of the traction chain. These eyes are thus located at the four corners of a rectangle which can be equilateral or elongated and along sides of this imaginary rectangle between the eyes or the eye locations, the ring can be formed with ribs projecting codirectionally, i.e. in the same direction from the ring. These ribs serve to bite into the ice or snow or the ground and include ribs which extend transversely to the direction of travel for improved traction and ribs which extend parallel to the direction of travel for improved vehicle tracking.

The ring has the breadth substantially of the tire and the traction element can be formed in one piece from steel, preferably by die forging.

In a preferred and best mode embodiment of the invention, the ring has a generally oval plan configuration whose length corresponds substantially to the width or breadth of the tire and thus the longer ribs are located transversely to the travel direction while the shorter ribs are located parallel to the travel direction.

The ribs project from the ring by a height which can be substantially equal to the thickness of the ring in regions other than the rib and can taper away from the body of the ring with substantially arcuate flanks. In this case, therefore, the ribs can be said to have a self-sharpening knife-blade or wedge-shaped cross section.

With such a rib height, the traction element can readily withstand all stresses to which such traction elements are usually subjected.

The die forging of the traction element in one piece from a wear-resistant material such as steel, materially limits the cost and provides a structurally stable unit which can be used for all purposes in which traction elements of this type have been utilized heretofore.

Of particular importance is the fact that the traction element of the invention not only provides improved traction, but also improved tracking of the wheel. Only conventional means is required to link the traction element in a traction chain.

BRIEF DESCRIPTION OF THE DRAWING

The above and other objects, features and advantages of the present invention will become more readily apparent from the following description, reference being made to the accompanying drawing in which:

FIG. 1 is a plan view of a traction element according to the invention showing a portion of the traction chain in dot-dash lines;

FIG. 2 is a section taken along the line II—II of FIG. 1; and

FIG. 3 is a section taken along the line III—III of FIG. 1.

SPECIFIC DESCRIPTION

The traction element illustrated in the drawing can form part of a traction chain adapted to encircle a pneumatic tire of a wheeled vehicle such as the wheel of a tractor truck, construction machine or passenger vehicle. Only one such traction element has been shown in FIG. 1, although it will be understood that generally a number of such traction elements can be provided in equispaced relationship on the chain although for passenger vehicles and the like it may be desirable simply to have a single such traction element or only two such traction elements at diametrically opposite locations on the chain.

The chain is formed by links 2 which are articulated to the traction element 1 by engaging in eyes 3 which can be provided on the traction element.

As a comparison of FIGS. 1–3 will show, the traction element 1 generally is in the form of a ring 4 which is planar, the plane of the ring being parallel to the plane of the drawing in FIG. 1.

At four diametrically opposite and spaced apart locations in the ring plane, the ring is formed unitarily (integrally) with the eyes 3 in which the links of the chain 2 engaged.

Between these eyes, which are located at the four corners of an imaginary rectangle, the element is formed unitarily with ribs 5 projecting from the plane, including short ribs extending in the travel direction, i.e. in the direction in which the chain extends, and long ribs extending transversely to the chain direction, the ribs being of identical cross section and converging away from the plane of the element.

Preferably, the element is elongated in the breadth of the tire, represented by the double-headed arrow 6 and is formed in one piece from steel by die forging.

When the ring is oval in accordance with the best mode embodiment of the invention, the long axis of the ring should correspond substantially to the width of the tire of the wheel to which the tire chain is applied.

The ribs 5 project to an extent substantially equal to the thickness 7 of the ring and have a wedge shaped or blade shaped cross section defined between curved flanks 5a and 5b which renders the ribs substantially self-sharpening to the extent that wear occurs.

The ribs which run transversely to the direction of travel, of course, provide for enhanced traction while the ribs running parallel to the direction of travel improved the tracking of the wheel.

While the back of the element is shown to be flat in the drawing, it can also be provided with ribs to engage in the tread of the tire and thereby limiting movement of the traction element on the wheel. Such additional ribs have not been illustrated and may be of a lesser height.

I claim:

1. A traction chain for a pneumatic tire wheel of a wheeled vehicle comprising at least one die-forged one piece traction element in the form of a flat unitary ring-shaped generally oval body having a long axis corresponding substantially to the width of a tire to which the chain is to be applied and provided at four diametrically opposite locations spaced apart from one another with respective eyes, and link means engageable in said eyes to incorporate said element in said chain, said body being formed between said eyes unitarily with ribs projecting codirectionally from said body, said ribs including ribs transverse to the direction of travel of the wheel and ribs parallel to the direction of travel thereof, said body being dimensioned to extend substantially the full width of said wheel, said ribs having a wedge-shaped self-sharpening cross section whereby each rib is defined between a pair of outwardly concave mutually converging curved flanks.

2. The traction chain defined in claim 1 wherein said locations are substantially at the corners of a rectangle and said ribs extend along sides of said rectangle.

3. The traction chain defined in claim 1 wherein said ribs include short ribs extending parallel to the direction of travel and long ribs extending transverse to the direction of travel.

4. The traction chain defined in claim 3 wherein said ribs project from said body by substantially an amount equal to the thickness of the cross section of the ring-shaped body.

* * * * *